United States Patent
Floriani et al.

(10) Patent No.: US 12,218,596 B2
(45) Date of Patent: Feb. 4, 2025

(54) CONTROL DEVICE OF A SWITCHING VOLTAGE REGULATOR AND SWITCHING VOLTAGE REGULATOR

(71) Applicant: STMicroelectronics S.r.l., Agrate Brianza (IT)

(72) Inventors: Ivan Floriani, Milan (IT); Elena Brigo, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 153 days.

(21) Appl. No.: 17/841,182

(22) Filed: Jun. 15, 2022

(65) Prior Publication Data

US 2022/0416657 A1 Dec. 29, 2022

(30) Foreign Application Priority Data

Jun. 29, 2021 (IT) .................. 102021000017072

(51) Int. Cl.
*H02M 3/158* (2006.01)
*H02M 1/00* (2006.01)

(52) U.S. Cl.
CPC ....... *H02M 3/1582* (2013.01); *H02M 1/0025* (2021.05)

(58) Field of Classification Search
CPC ............. H02M 1/0003; H02M 1/0025; H02M 3/158; H02M 3/1582
See application file for complete search history.

(56) References Cited

U.S. PATENT DOCUMENTS

| | | |
|---|---|---|
| 7,821,238 B1 | 10/2010 | Li |
| 8,335,249 B1 | 12/2012 | Su et al. |
| 2015/0381039 A1* | 12/2015 | Hari .................. H02M 1/15 323/271 |
| 2017/0077817 A1 | 3/2017 | Houston |
| 2017/0207703 A1 | 7/2017 | Houston et al. |
| 2018/0041119 A1 | 2/2018 | Zhang et al. |
| 2018/0358898 A1* | 12/2018 | Yamaguchi ......... H02M 3/1582 |

FOREIGN PATENT DOCUMENTS

JP    2008236915 A    10/2008

\* cited by examiner

*Primary Examiner* — Alex Torres-Rivera
(74) *Attorney, Agent, or Firm* — Slater Matsil, LLP

(57) ABSTRACT

In an embodiment a control device includes a first input configured to receive a measurement signal representative of an output voltage of a switching circuit of a voltage regulator, a state determination block coupled to the first input and configured to generate a signal of actual operating condition of the voltage regulator and a driving signals generation module configured to generate at least one switching command signal for the switching circuit from an error signal representative of a difference between the output voltage and a nominal voltage, wherein the driving signals generation module includes an error-compensation circuit having a transfer function and configured to generate a control signal from the error signal and the actual operating condition signal, the control signal being a function of the actual operating condition.

20 Claims, 13 Drawing Sheets

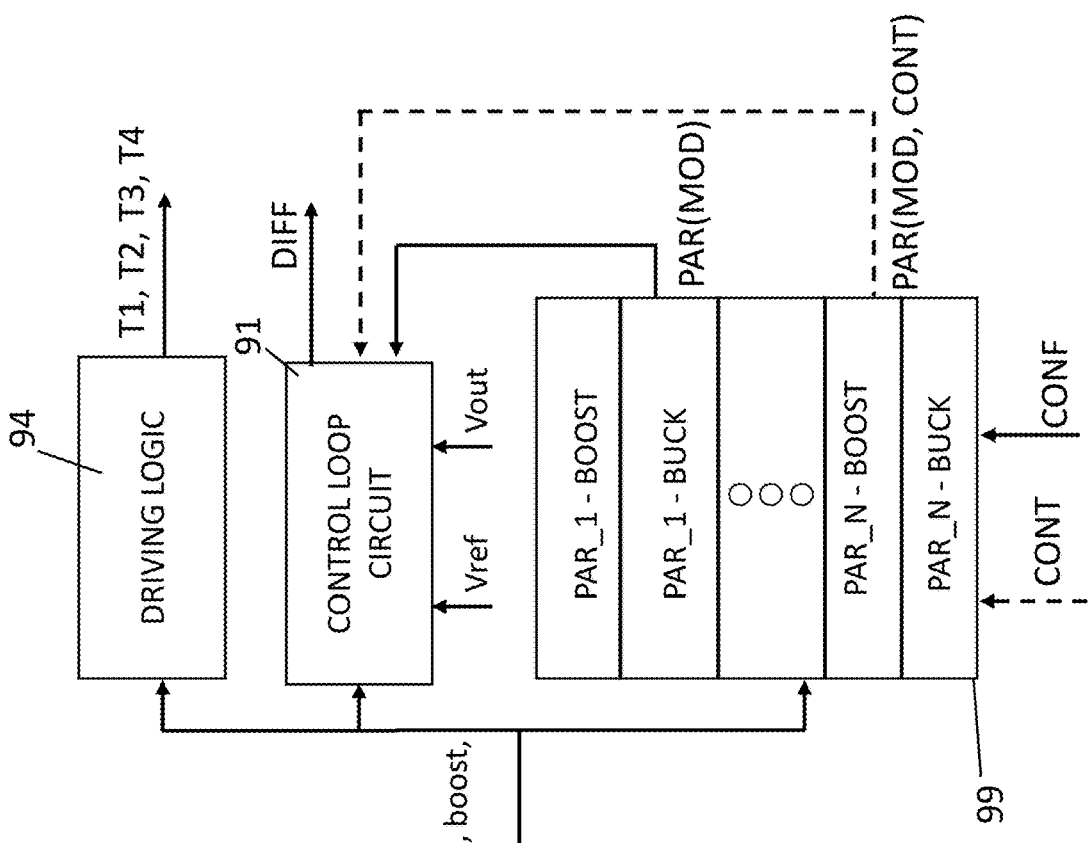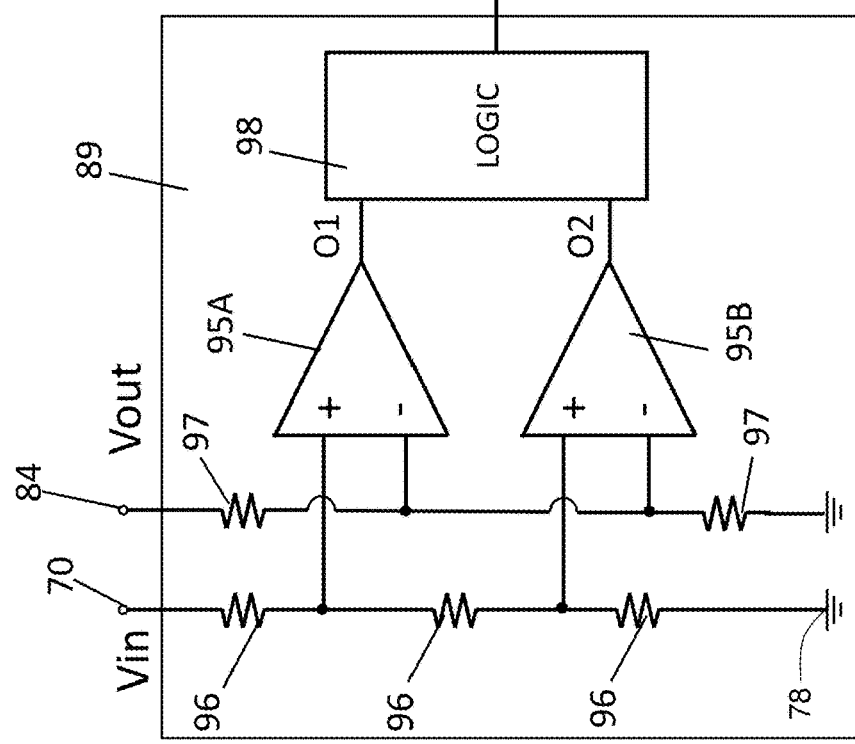
Fig. 5

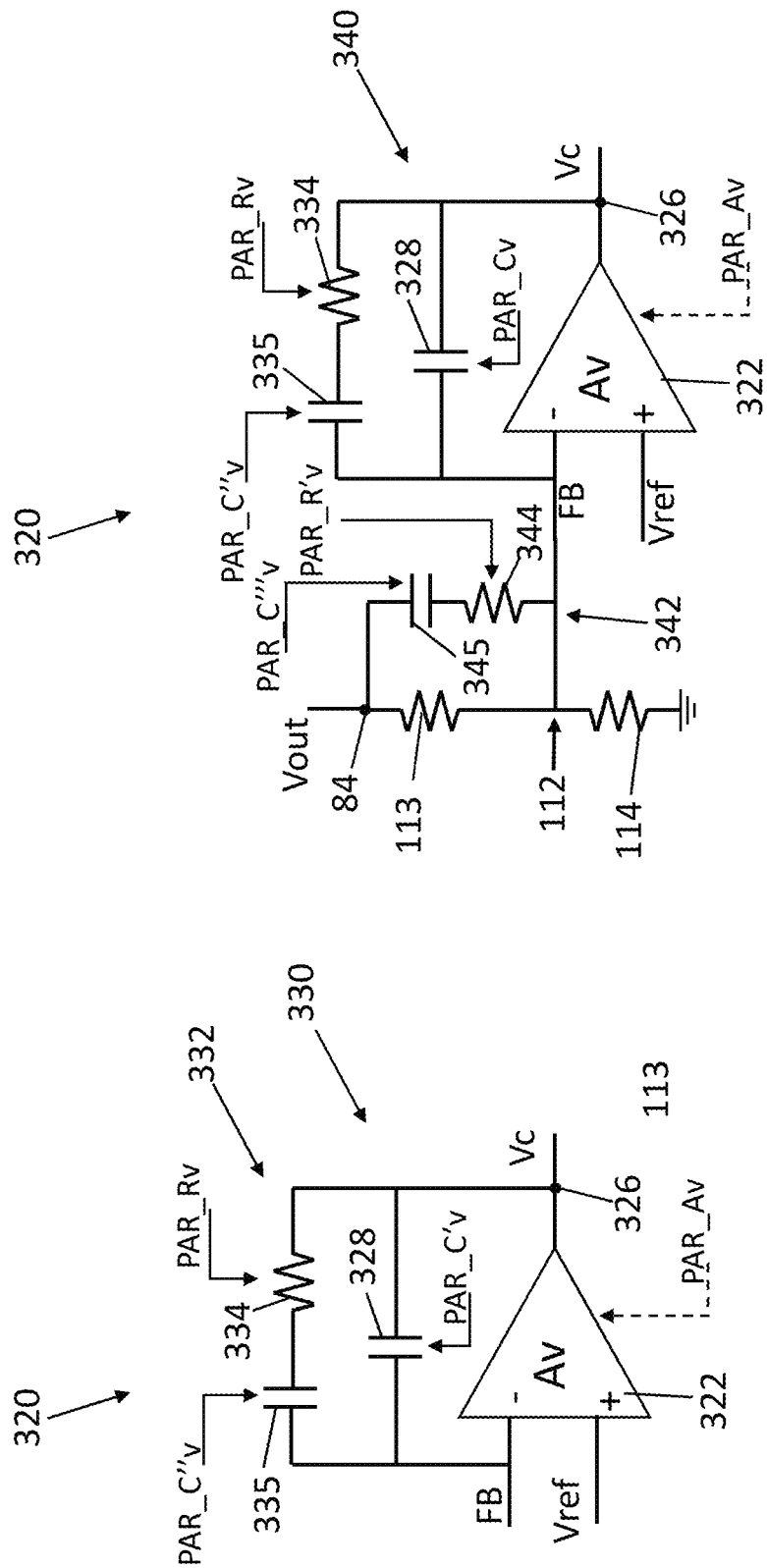

CONTROL DEVICE OF A SWITCHING VOLTAGE REGULATOR AND SWITCHING VOLTAGE REGULATOR

CROSS-REFERENCE TO RELATED APPLICATIONS

This application claims the benefit of Italian Application No. 102021000017072, filed on Jun. 29, 2021, which application is hereby incorporated herein by reference.

TECHNICAL FIELD

The present invention relates to a control device of a switching voltage regulator and to a switching voltage regulator.

BACKGROUND

As is known, a switching voltage regulator is able to convert a DC input voltage into a DC output voltage using different operating schemes and can be obtained using different topologies, one of the most widespread being the four-switch non-inverting topology.

SUMMARY

Various embodiments overcome the disadvantages of the prior art.

Various embodiments provide a control device of a switching voltage regulator and a switching voltage regulator.

BRIEF DESCRIPTION OF THE DRAWINGS

For a better understanding of the present invention, some embodiments thereof are now described, purely by way of non-limiting example, with reference to the attached drawings, wherein:

FIG. 5 shows a block diagram of a different portion of the voltage regulator of FIG. 3;

FIGS. 13-15 show circuit diagrams of different embodiments of a portion of the voltage regulator of FIG. 12;

DETAILED DESCRIPTION OF ILLUSTRATIVE EMBODIMENTS

Figure 1:
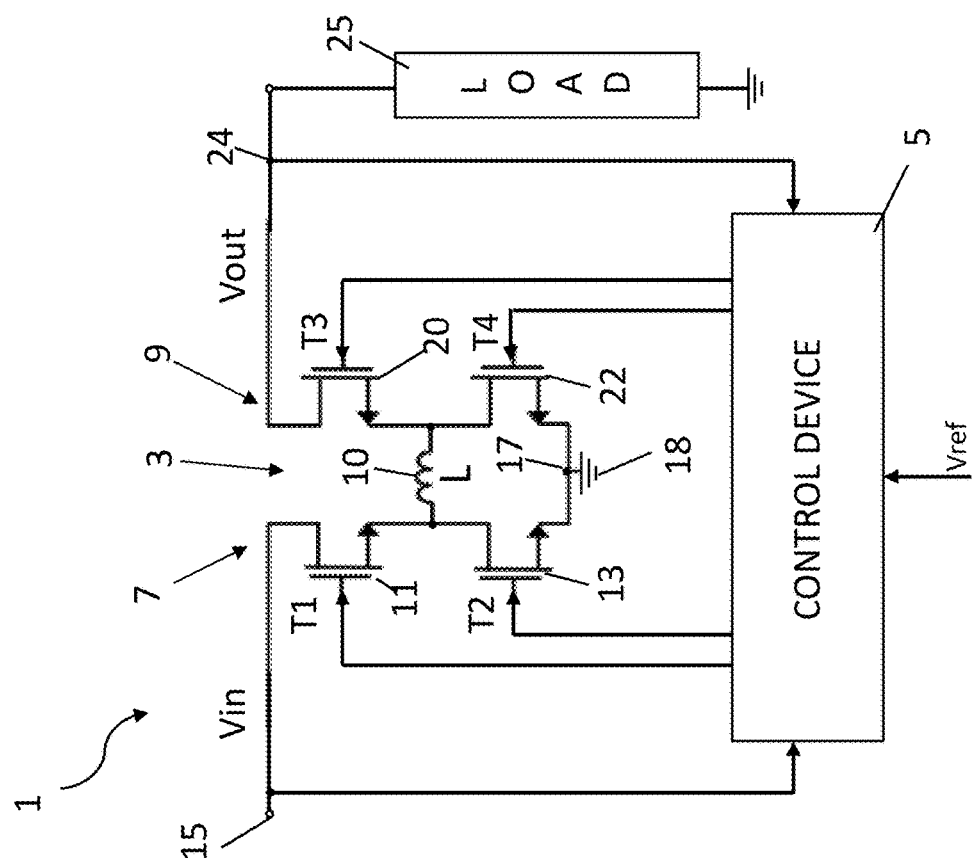
FIG. 1 shows a block diagram of a known switching voltage regulator.

In FIG. 1 shows a switching voltage regulator 1 comprising a four-switch non-inverting switching circuit, referred to hereinafter as switching circuit 3, and a control device 5.

The switching circuit 3 is formed by a first half-bridge 7, a second half-bridge 9 and an inductor 10.

The first half-bridge 7 is formed by a first high-side switch 11 and a first low-side switch 13, here two N-MOS transistors, coupled in series between an input terminal 15 and a common node 17.

The common node 17 is coupled to a reference-potential line (ground) 18.

An input voltage Vin with respect to ground 18 is applied to the input terminal 15.

The second half-bridge 9 is formed by a second high-side switch 20 and a second low-side switch 22, also here two N-MOS transistors, coupled in series between an output node 24 and the common node 17.

An output voltage Vout, referenced to the ground 18, is present on the output node 24 and is applied to a load 25.

The inductor 10 is coupled between an intermediate node of the first half-bridge 7 and an intermediate node of the second half-bridge 9.

As a function of the ratio between the input voltage Vin and the output voltage Vout, the switching voltage regulator 1 can work in one of three operating modes also known as "buck" if Vin>Vout, "boost" if Vin<Vout and "buck-boost" if Vin≈Vout.

According to the operating mode, by appropriately controlling switching of the first and the second half-bridges 7, 9, it is in fact possible to cause the output voltage Vout to be maintained at a reference voltage Vref, chosen, for example, by a user according to a specific application, irrespective of the value of the input voltage Vin.

For this purpose, the control device 5 is coupled to the input node 15 and to the output node 24 and receives the reference voltage Vref.

From the input voltage Vin, the output voltage Vout and the reference voltage Vref, the control device 5 determines the operating mode of the switching voltage regulator 1 and generates four switch-command signals T1, T2, T3, T4, which command switching, respectively, of the first high-side switch 11, the first low-side switch 13, the second high-side switch 20, and the second low-side switch 22.

In detail, the control device 5 forms a loop control circuit configured to measure an error between the output voltage Vout and the reference voltage Vref, generate a correction signal that compensates the error, and modify the switch-command signals T1, T2, T3, T4 so that the output voltage Vout remains equal to the reference voltage Vref.

It is known to design the control device 5 so that the control parameters of the loop control circuit that generate the correction signal are chosen in the design stage irrespective of the operating mode (buck, boost, and buck-boost) of the switching voltage regulator 1, i.e. by finding a trade-off between stability and dynamic performance of the switching voltage regulator 1 that is valid for all operating modes.

For instance, an approach envisages fixing the control parameters so that the switching voltage regulator 1 is stable in an operating condition critical for the stability of the switching voltage regulator 1.

For example, the critical operating condition may be in boost mode, when the input voltage Vin has a minimum value and an output current, for instance through the load 25, has a maximum value.

However, the above approach has disadvantages.

In fact, optimising the loop control circuit so that the switching voltage regulator 1 is stable in the critical operating condition causes the switching voltage regulator 1 to have poor performance in the other operating modes. For instance, in this case, the switching voltage regulator 1 will have, in buck mode, a bandwidth narrower than what it would be possible to obtain without at the same time jeopardising the stability thereof.

Figure 2:
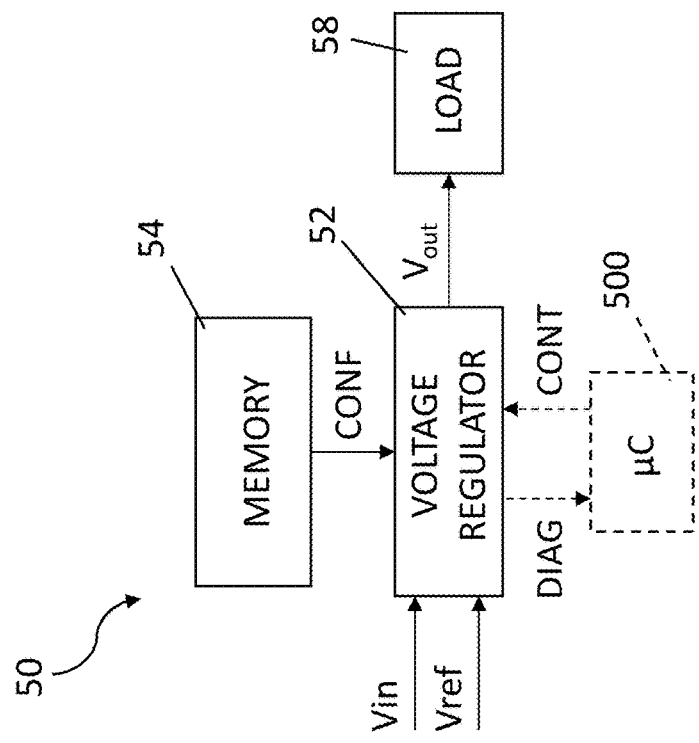
FIG. 2 shows a block diagram of an electronic apparatus incorporating the present voltage regulator.

FIG. 2 shows a block diagram of an electronic apparatus 50 comprising a switching voltage regulator 52, also referred to hereinafter simply as regulator 52, a memory 54 and a load 58, coupled together.

The regulator 52 receives an input voltage Vin and a reference voltage Vref and supplies an output voltage Vout to the load 58.

The reference voltage Vref indicates a desired value of the output voltage Vout and is chosen by a user of the electronic apparatus 50, for example in an initialisation step of the electronic apparatus 50.

The reference voltage Vref received by the regulator 52 is here of an analog type. However, the regulator 52 can also receive a digital value of the reference voltage Vref and convert it internally into a voltage of an analog type by a dedicated digital-to-analog converter (DAC) (not illustrated).

The memory 54, of a non-volatile type, stores a plurality of configuration parameters, as described in detail hereinafter, and provides to the regulator 52 a configuration signal CONF indicative of the configuration parameters.

In one embodiment, the electronic apparatus 50 may also comprise a control unit 500 (represented by a dashed line in FIG. 2), coupled to the regulator 52. The control unit 500 may be integrated in a same die with the regulator 52 or may be integrated in a different die.

Figure 3:
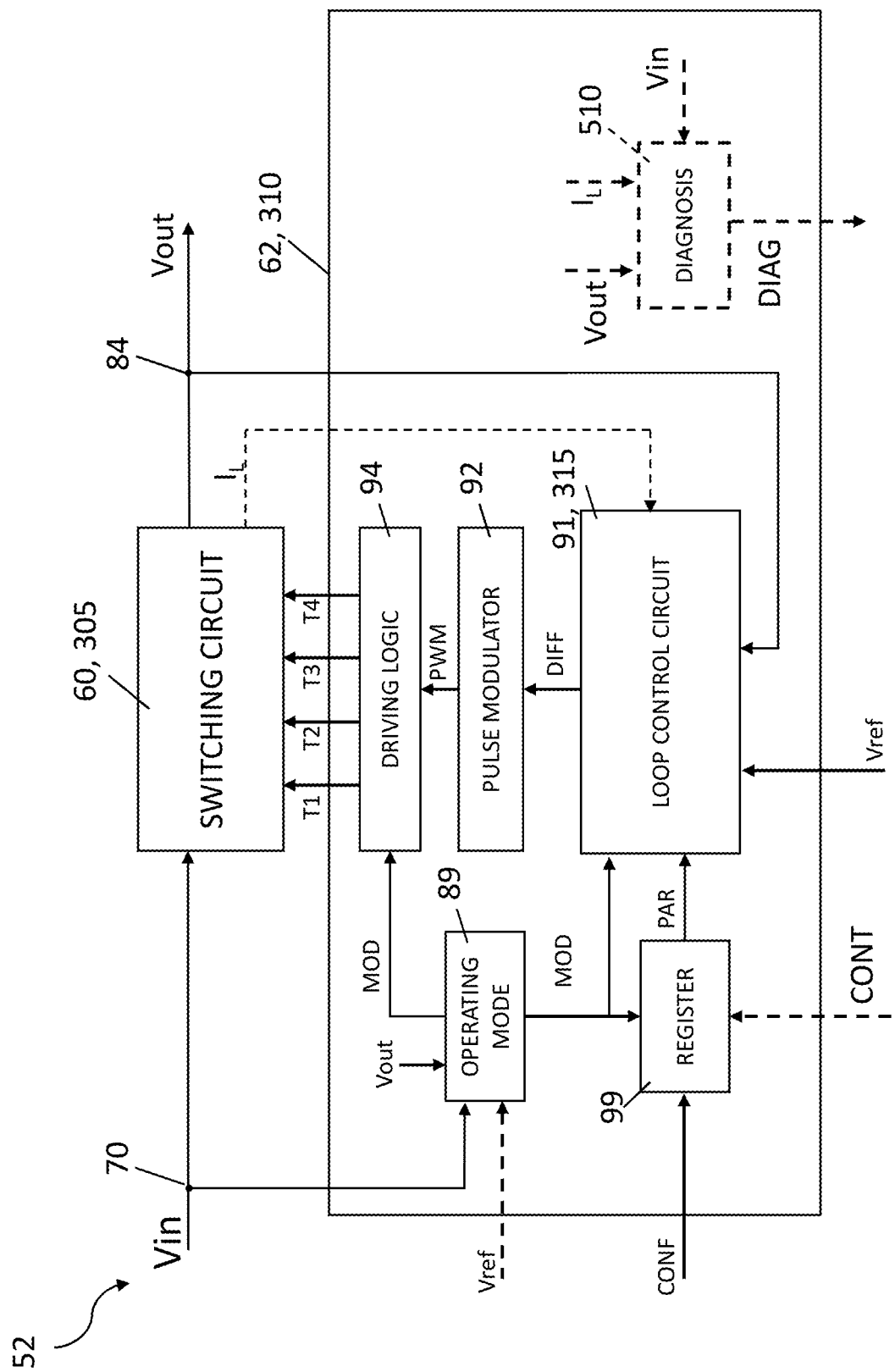
FIG. 3 shows a block diagram of the voltage regulator of FIG. 2 comprising a control device.

As illustrated in FIG. 3, the regulator 52 comprises a switching circuit and a control device designated, respectively, by 60 and 62 in the case of a current-control mode, described with reference to FIGS. 4-9, and by 305 and 310 in the case of a voltage-control mode, described with reference to FIG. 12.

The switching circuit 60, 305 and the control device 62, 310 may be integrated in a same die or formed in different dice.

Figure 4:
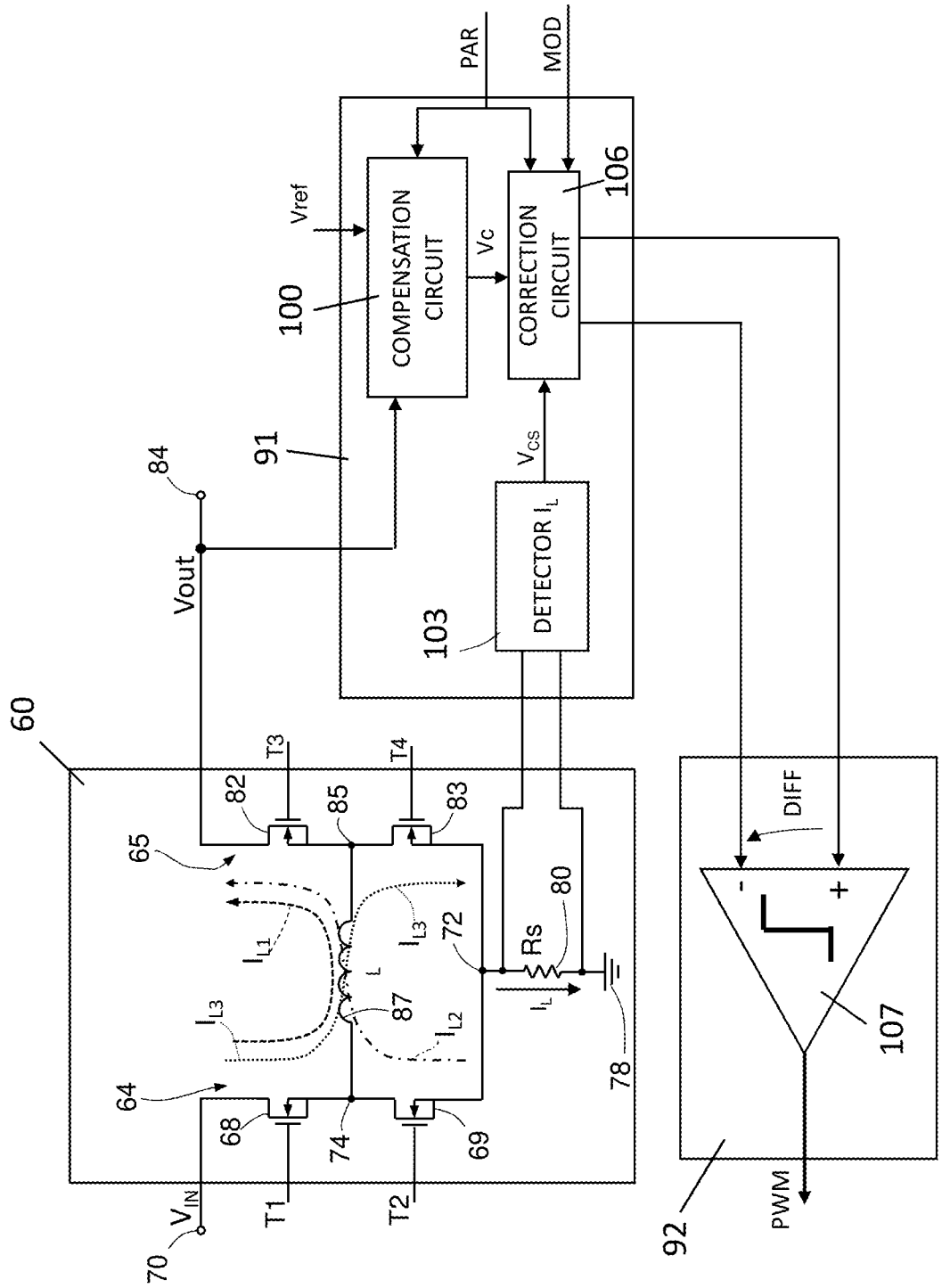
FIG. 4 shows a block diagram of a portion of the voltage regulator of FIG. 3, comprising a loop control circuit, according to one embodiment.

The switching circuit 60, illustrated in detail in FIG. 4, is here a four-switch non-inverting circuit, in particular configured to operate in buck, boost, and buck-boost mode, according to whether the input voltage Vin is, respectively, higher, lower, and approximately equal to the output voltage Vout (or to the reference voltage Vref).

In particular (FIG. 4), the switching circuit 60 is formed by a first half-bridge 64 and a second half-bridge 65.

The first half-bridge 64 is formed by a first high-side switch 68 and a first low-side switch 69, here two N-MOS transistors, coupled in series between an input node 70 and a common node 72.

In detail, the first high-side switch 68 is coupled between the input node 70 and an intermediate node 74 of the first half-bridge 64, and the first low-side switch 69 is coupled between the intermediate node 74 of the first half-bridge 64 and the common node 72.

The input node 70 receives the input voltage Vin with respect to a reference-potential line (ground) 78.

In this embodiment, the regulator 52 is configured to operate in current-control mode; consequently, the common node 72 is coupled to the ground 78 by a sense resistor 80 having a resistance Rs.

The second half-bridge 65 is formed by a second high-side switch 82 and a second low-side switch 83, which also here are two N-MOS transistors, coupled in series between an output node 84 and the common node 72.

In detail, the second high-side switch 82 is coupled between the output node 84 and an intermediate node 85 of the second half-bridge 65, and the second low-side switch 83 is coupled between the intermediate node 85 of the second half-bridge 65 and the common node 72.

The output node 84 supplies the output voltage Vout, with respect to ground the 78.

The switching circuit 61 also comprises an inductor 87 having an inductance L and coupled between the intermediate node 74 of the first half-bridge 64 and the intermediate node 85 of the second half-bridge 65.

Again with reference to FIG. 3, the control device 62 is coupled to the output node 84 and to the input node 70 and further receives the configuration signal CONF and the reference voltage Vref.

In this embodiment, the control device 62 is also coupled to the sense resistor 80, from which it receives a signal indicating the current $I_L$ that flows through the inductor 87.

The control device 62 supplies a first switch-command signal T1, a second switch-command signal T2, a third switch-command signal T3, and a fourth switch-command signal T4 to the switching circuit 60.

The first, second, third, and fourth switch-command signals T1, T2, T3, T4 control switching, respectively, of the first high-side switch 68, the first low-side switch 69, the second high-side switch 82, and the second low-side switch 83, according to whether the regulator 52 is in the buck, boost, or buck-boost operating modes.

In the buck operating mode, i.e., when the input voltage Vin is higher than the output voltage Vout, the third switch-command signal T3 maintains the second high-side switch 82 in a closed or ON state (i.e., enabling a passage of current), whereas the fourth switch-command signal T4 maintains the second low-side switch 83 in an open or OFF state (i.e., blocking the passage of current). The first and the second switch-command signals T1, T2 each have a square waveform such that a first step and a second step of current-flow are obtained.

In the first current-flow step, the first switch-command signal T1 closes the first high-side switch 68, and the second switch-command signal T2 opens the first low-side switch 69. Consequently, a current (indicated by a dashed arrow $I_{L1}$ in FIG. 4) may flow from the input node 70 to the output node 84 through the first high-side switch 68, the inductor 87, and the second high-side switch 82.

In the second current-flow step, the first switch-command signal T1 opens the first high-side switch 68, and the second switch-command signal T2 closes the first low-side switch 69. Consequently, a current (indicated by a dashed-and-dotted arrow $I_{L2}$ in FIG. 4) may flow from the ground 78 to the output node 84 through the sense resistor 80, the first low-side switch 69, the inductor 87, and the second high-side switch 82.

By modifying the duty cycle of the first and the second switch-command signals T1, T2, i.e., the ratio between the duration of the first and the second current-flow steps, it is possible to reduce the output voltage Vout with respect to the input voltage Vin, until the output voltage Vout is equal to the reference voltage Vref.

In the boost operating mode, i.e., if the desired output voltage Vout (i.e., the desired voltage Vref) is higher than the input voltage Vin, the first switch-command signal T1 maintains the first high-side switch 68 closed, while the second switch-command signal T2 maintains the first low-side switch 69 open. The third and the fourth switch-command signals T3, T4 each have a square waveform such that a third and a fourth current-flow steps are obtained.

In the third current-flow step, the third switch-command signal T3 closes the second high-side switch 82, and the fourth switch-command signal T4 opens the second low-side switch 83. Consequently, a current (once again indicated by the dashed arrow $I_{L1}$ in FIG. 4) may flow from the input node 70 to the output node 4 through the first high-side switch 68, the inductor 87, and the second high-side switch 82.

In the fourth current-flow step, the third switch-command signal T3 opens the second high-side switch 82, and the fourth switch-command signal T4 closes the second low-side switch 83. Consequently, a current (indicated by a dotted arrow $I_{L3}$ in FIG. 4) may flow from the input node 70 to the ground 78 through the first high-side switch 68, the inductor 87, the second low-side switch 83, and the sense resistor 80.

By modifying the duty cycle of the third and the fourth switch-command signals T3, T4, i.e., the ratio between the duration of the third and the fourth current-flow steps, it is possible to increase the output voltage Vout with respect to the input voltage Vin until the output voltage Vout is equal to the reference voltage Vref.

In the buck-boost operating mode, the first, the second, the third, and the fourth switch-command signals T1, T2, T3, T4 may be controlled so as to alternate a current-flow step of the buck mode with a current-flow step of the boost mode. For instance, the first switch-command signal T1 may be the same as the fourth switch-command signal T4, and the third switch-command signal T3 may be the same as the second switch-command signal T2 so as to obtain a fifth current-flow step and a sixth current-flow step.

In detail, the fifth current-flow step may be the same as the second current-flow step, where a current (indicated once again by the dashed-and-dotted arrow $I_{L2}$ in FIG. 4) may flow from the ground 78 to the output node 84 through the sense resistor 80, the first low-side switch 69, the inductor 87, and the second high-side switch 82. The sixth current-flow step may be the same as the fourth current-flow step, where a current (indicated once again by the dotted arrow $I_{L3}$ in FIG. 4) may flow from the input node 70 to the ground 78 through the first high-side switch 68, the inductor 87, the second low-side switch 83, and the sense resistor 80.

In addition, in the buck-boost operating mode, the switch-command signals T1-T4 may be driven so as to obtain also a seventh current-flow step, which is the same as the first and the third current-flow steps, wherein a current (indicated once again by the dashed arrow $I_{L1}$ in FIG. 4) may flow from the input node 70 to the output node 84 through the first high-side switch 68, the inductor 87, and the second high-side switch 82.

By modifying the duty cycle, i.e., the ratio between the duration of the fifth, the sixth, and the seventh current-flow steps, it is possible to modify the output voltage Vout so that it is equal to the reference voltage Vref.

In order to control appropriately switching of the switching circuit 60, the control device 62 comprises a mode-determining module 89, a control loop circuit 91, a pulse modulator 92 and a driving logic circuit 94.

As illustrated in detail in FIG. 5, in this embodiment, the mode-determining module 89 is coupled to the input node 70 and to the output node 84 of the regulator 52 and comprises two mode comparators 95A, 95B.

The input voltage Vin is coupled to the non-inverting input of the mode comparators 95A, 95B by a voltage divider including a plurality of resistors, here three resistors 96. The output voltage Vout is coupled to the inverting input of the mode comparators 95A, 95B by a voltage divider including a plurality of resistors, here two resistors 97.

The mode comparators 95A, 95B each generate a respective output logic signal O1, O2, which is a function of the difference between the input voltage Vin and the output voltage Vout.

In detail, the resistors 96, 97 and the mode comparators 95A, 95B are designed in such a way that the output logic signals O1, O2 switch when the difference between the output voltage Vout and the input voltage Vin is equal to a first buck-boost threshold Vth1 or to a second buck-boost threshold Vth2.

The output logic signals O1, O2 of the mode comparators 95A, 95B are supplied to a verification logic module 98, which compares the output logic signals O1, O2 and generates a mode signal MOD indicative of the current operating mode (buck, boost, or buck-boost) of the regulator 52.

For instance, if Vth1<(Vin−Vout)<Vth2, then the verification logic module 98 may set the buck-boost operating mode as the current operating mode. If (Vin−Vout)>Vth2, then the verification logic module 98 may set the buck operating mode as the current operating mode. If (Vin−Vout)<Vth1, then the verification logic module 98 may set the boost operating mode as the current operating mode.

The control device 62 further comprises a register 99 (illustrated in detail in FIG. 5), which receives the configuration signal CONF from the memory 54, for example in a start-up step of the electronic apparatus 50, and stores the configuration parameters.

The configuration signal CONF is indicative of a plurality of control parameters PAR_1, . . . , PAR_N useful for control of the regulator 52, as described in detail hereinafter. In detail, the configuration signal CONF indicates, for each control parameter PAR_i of the plurality of control parameters PAR_1, . . . , Par_N, at least two values, at least one of which is associated with the buck operating mode and at least one of which is associated with the boost operating mode.

In use, the register 99 receives the mode signal MOD and generates a control parameters signal PAR. The control parameters signal PAR indicates, for each control parameter PAR_i, one of the values of the control parameter PAR_i stored in the register 99 and associated with the current operating mode.

In the case where the regulator 52 comprises the control unit 500, the control device 62 also comprises a diagnosis unit 510 (represented by a dashed line in FIG. 3) configured to generate a diagnosis signal DIAG indicative of a specific operating condition of the regulator 52. The diagnosis signal DIAG is supplied to the control unit 500. The control unit 500 processes the diagnosis signal DIAG and supplies a plurality of control signals CONT to the regulator 52, in particular to the register 99, indicative of the desired values of the control parameters PAR_i.

In practice, for each operating mode (buck, boost, buck-boost), the control unit 500 determines, as a function of the specific operating condition, the values of the control parameters PAR stored in the register 99 that optimise the performance of the regulator 52 and therefore to be provided to the control loop circuit 91.

For instance, the diagnosis unit 510 may comprise a circuit for measuring the current that flows through the load 58. In this case, the diagnosis signal DIAG may indicate a measured value of the load current. As a function of the measured value of the load current, the control signal CONT may indicate a specific value of each control parameter PAR_i stored in the register 99.

In addition or as an alternative, the diagnosis unit 510 may comprise a circuit configured to provide an accurate measurement of the output voltage Vout and/or of the input voltage Vin of the switching circuit 60. The control unit 500, through the control signal CONT, may thus select the values of the control parameters PAR_i not only as a function of the ratio between the input voltage Vin and the output voltage Vout, but also as a function of just the value of the input voltage Vin and/or of the output voltage Vout.

Again with reference to FIG. 4, the control loop circuit 91 comprises a compensation circuit 100, a current detector 103 and a correction circuit 106.

The compensation circuit 100 generates a compensation signal Vc as a function of the control parameters signal PAR and of a difference $V_E$ between the output voltage Vout and the reference voltage Vref.

The current detector 103 is coupled to the sense resistor 80 and generates a current-sense signal Vcs associated with the inductor current $I_L$.

The correction circuit 106 receives the compensation signal Vc and the current-sense signal Vcs and calculates the difference thereof to generate a differential signal DIFF, supplied to the pulse modulator 92, at input to a comparator 107.

The comparator 107, from the differential signal DIFF, generates a pulse-width-modulated signal PWM, supplied to the driving logic circuit 94 (FIG. 3) that generates, in a known way, for example, as described above, the first, the second, the third, and the fourth switch-command signals T1, T2, T3, T4 for driving the switching circuit 60.

The compensation circuit 100 (FIG. 6) comprises an operational transconductance amplifier (OTA) 110 having a variable gain gm and receiving at input the reference voltage Vref and a feedback voltage FB.

In this embodiment, the feedback voltage FB is a fraction of the output voltage Vout. In detail, the feedback voltage FB is obtained by a feedback voltage divider 112 here comprising two resistors 113, 114 arranged in series between the ground 78 and the output node 84.

The OTA 110 has an output 115 on which it supplies an error current $I_E$ proportional to the difference $V_E$ present between the input terminals, according to the formula: $I_E = gm \cdot V_E$.

The compensation circuit 100 further comprises a variable compensation network 116 coupled between the ground 78 and the output 115 of the OTA 110 and generating the compensation signal Vc, referred to hereinafter also as compensation voltage.

In detail, the variable compensation network 116 is here of the second order and is formed by a first compensation capacitor 123 having a variable capacitance C1 and coupled in parallel with a series circuit formed by a compensation resistor 118, having a variable resistance Rc, and a second compensation capacitor 121, having a variable capacitance C2.

In this embodiment, the control parameters signal PAR comprises a first signal PAR_gm that commands the variation of the value of the variable gain gm of the OTA 110, a second signal PAR_C1 that commands the variation of the value of the variable capacitance C1 of the first compensation capacitor 123, a third signal PAR_C2 that commands the variation of the value of the variable capacitance C2 of the second compensation capacitor 121, and a fourth signal PAR_Rc that commands the variation of the value of the variable resistance Rc of the compensation resistor 118.

Figure 7:
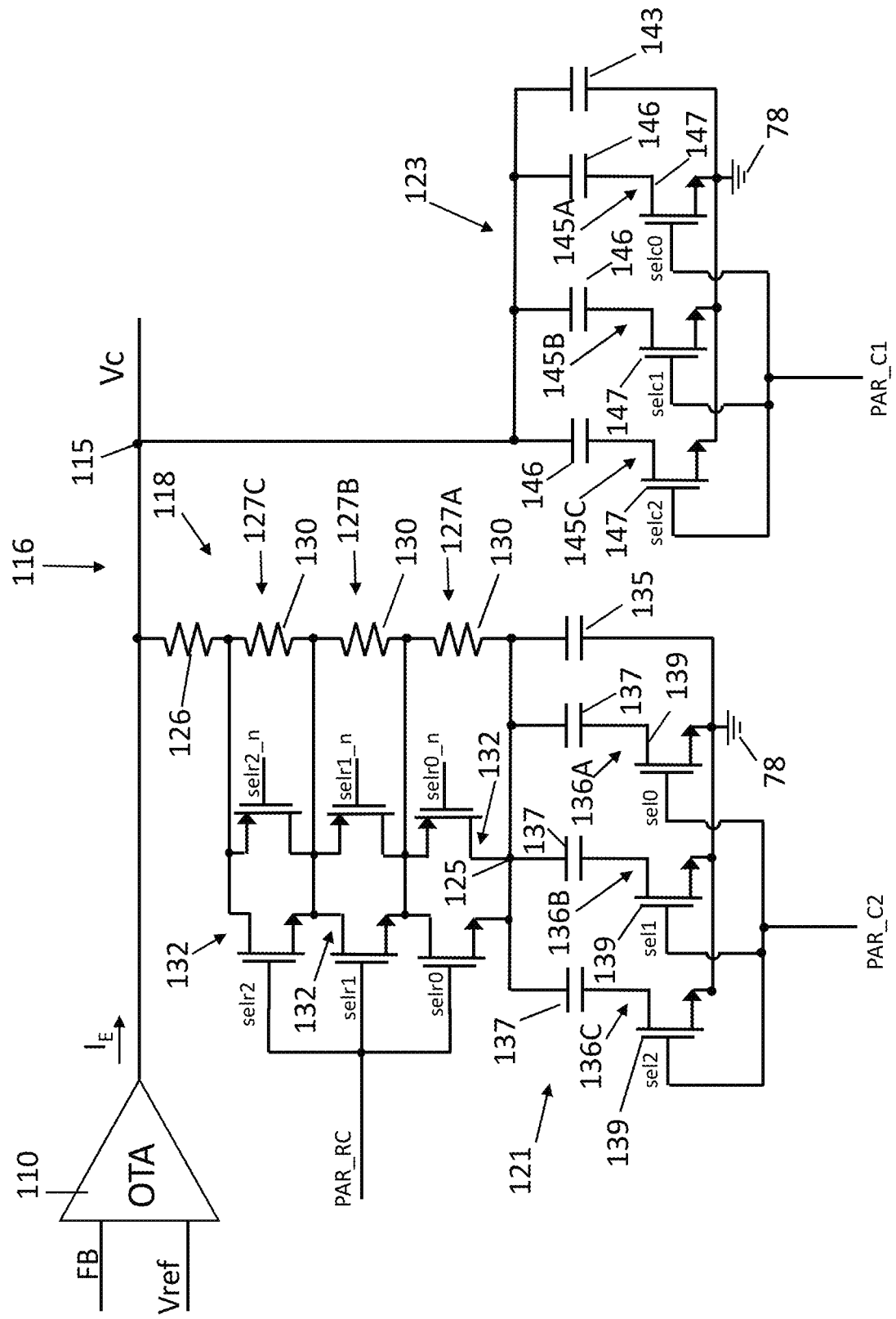
FIG. 7 shows a circuit diagram of a portion of the control loop circuit of FIG. 6, according to one embodiment.

FIG. 7 shows an embodiment of the variable compensation network 116.

The compensation resistor 118 is coupled between the output 115 of the OTA 110 and a resistor terminal 125 and is formed by a first resistor 126 and a plurality of selectable resistors, here a first selectable resistor 127A, a second selectable resistor 127B and a third selectable resistor 127C, arranged in series.

The selectable resistors 127A-127C are each formed by a resistor 130 and a resistor switch 132 arranged in parallel with respect to one another.

The resistors 130 may have a same value of resistance or a different value, which can be determined in the design stage according to the specific application.

The resistor switches 132 are here each formed by an N-MOS transistor and a P-MOS transistor having source and drain terminals coupled together and receiving, respectively, the fourth signal PAR_Rc of the control parameters signal PAR and a negated value thereof.

In detail, the fourth signal PAR_Rc of the control parameters signal PAR comprises a plurality of pairs of complementary bits, one for each selectable resistor 127A-127C.

In detail, in this embodiment, the fourth signal PAR_Rc of the control parameters signal PAR comprises a first pair of complementary bits (selr0, selr0_n) for the first selectable resistor 127A, a second pair of complementary bits (selr1, selr1_n) for the second selectable resistor 127B, and a third pair of complementary bits (selr2, selr2_n) for the third selectable resistor 127C.

If, for example, the first pair of complementary bits (selr0, selr0_n) has the value (1,0), then the resistor switch 132 of the first selectable resistor 127A is closed and forms a short-circuit in parallel to the respective resistor 130. If moreover, once again by way of example, both the second pair and the third pair of complementary bits (selr0, selr0_n) have the value (0,1), then both the resistor switch 132 of the second selectable resistor 127B and the resistor switch 132 of the third selectable resistor 127C are open.

Therefore, in the example considered, part of the error current $I_E$ flows through the first resistor 126 and through the resistor 130 of the second and the third selectable resistors 127B, 127C. Accordingly, the resistance Re of the compensation resistor 118 is given by the sum of the resistances of the first resistor 126, the resistor 130 of the second selectable resistor 127B and the resistor 130 of the third selectable resistor 127C.

In practice, in this embodiment, the compensation resistor 118 may have, in use, up to a maximum of eight different values, as a function of the resistance value of the resistors 126, 130 and of the number of selectable resistors 127A-127C activated.

The second compensation capacitor 121 is coupled between the resistor terminal 125 and the ground 78 and is formed by a first capacitor 135 and a plurality of selectable capacitors, here a first selectable capacitor 136A, a second selectable capacitor 136B and a third selectable capacitor 136C, arranged in parallel to one another.

The selectable capacitors 136A-136C of the second compensation capacitor 121 are each formed by a capacitor 137 and a capacitor switch 139 coupled in series.

The capacitors 137 of the selectable capacitors 136A-136C of the second compensation capacitor 121 may have a same value of capacitance or a different value, which can be determined in the design stage according to the specific application.

The capacitor switches 139 of the selectable capacitors 136A-136C of the second compensation capacitor 121 are here each formed by an N-MOS transistor, whose switching is controlled by the third signal PAR_C2 of the control parameters signal PAR.

The third signal PAR_C2 of the control parameters signal PAR here comprises three bits, one for each selectable capacitor 136A-136C of the second compensation capacitor 121.

In detail, in this embodiment, the third signal PAR_C2 of the control parameters signal PAR comprises a first bit sel0, a second bit sel1 and a third bit sel2, respectively, for the first, the second, and the third selectable capacitors 136A, 136B, 136C of the second compensation capacitor 121.

If, for example, the first bit sel0 has the value '1', then the capacitor switch 139 of the first selectable capacitor 136A of the second compensation capacitor 121 is closed and couples the respective capacitor 137 to the ground 78. If moreover, once again by way of example, the second and the third bits sel1, sel2 have the value '0', then the respective capacitor switches 139 are open.

Therefore, in the example considered, part of the error current $I_E$ flows between the resistor node 125 and the ground 78 through the first capacitor 135 and the first selectable capacitor 136A of the second compensation capacitor 121. Accordingly, the variable capacitance C2 of the second compensation capacitor 121 is given by the sum of the capacitances of the respective first capacitor 135 and of the respective first selectable capacitor 136A.

In practice, in this embodiment, the second compensation capacitor 121 may have, in use, up to a maximum of eight different values as a function of the value of capacitance of the respective capacitors 135, 137 and of the number of respective selectable capacitors 136A-136C activated.

The first compensation capacitor 123 is coupled between the output 115 of the OTA 110 and the ground 78 and is formed by a first capacitor 143 and a plurality of selectable capacitors, here a first selectable capacitor 145A, a second selectable capacitor 145B, and a third selectable capacitor 145C, coupled in parallel to one another.

The selectable capacitors 145A-145C of the first compensation capacitor 123 are each formed by a capacitor 146 and a capacitor switch 147 coupled together in series.

The capacitors 146 of the selectable capacitors 145A-145C of the first compensation capacitor 123 can have a same value of capacitance or a different value, which can be determined in the design stage according to the specific application.

The capacitor switches 147 of the first compensation capacitor 123 are here each formed by an N-MOS transistor, whose switching is controlled by the second signal PAR_C1 of the control parameters signal PAR.

The second signal PAR_C1 of the control parameters signal PAR here comprises three bits, one for each selectable capacitor 145A-145C of the first compensation capacitor 123.

In detail, in this embodiment, the second signal PAR_C1 of the control parameters signal PAR comprises a first bit selc0, a second bit selc1 and a third bit selc2, respectively, for the first, the second and the third selectable capacitors 145A, 145B, 145C of the first compensation capacitor 123.

If, for example, the first bit selc0 has the value '1', then the capacitor switch 147 of the first selectable capacitor 145A of the first compensation capacitor 123 is closed and couples the respective capacitor 146 to the ground 78. If moreover, once again by way of example, the second and the third bits selc1, selc2 have the value '0', then the respective capacitor switches 147 are open.

Therefore, in the example considered, part of the error current $I_E$ flows between the output 115 of the OTA 110 and the ground 78 through the first capacitor 143 and the first selectable capacitor 145A of the first compensation capacitor 123. Accordingly, the variable capacitance C1 of the first compensation capacitor 123 is given by the sum of the capacitances of the respective first capacitor 143 and the respective first selectable capacitor 145A.

In practice, in this embodiment, the first compensation capacitor 123 may have, in use, up to a maximum of eight different values as a function of the value of capacitance of the respective capacitors 143, 146 and of the number of respective selectable capacitors 145A-145C activated.

Figure 8:
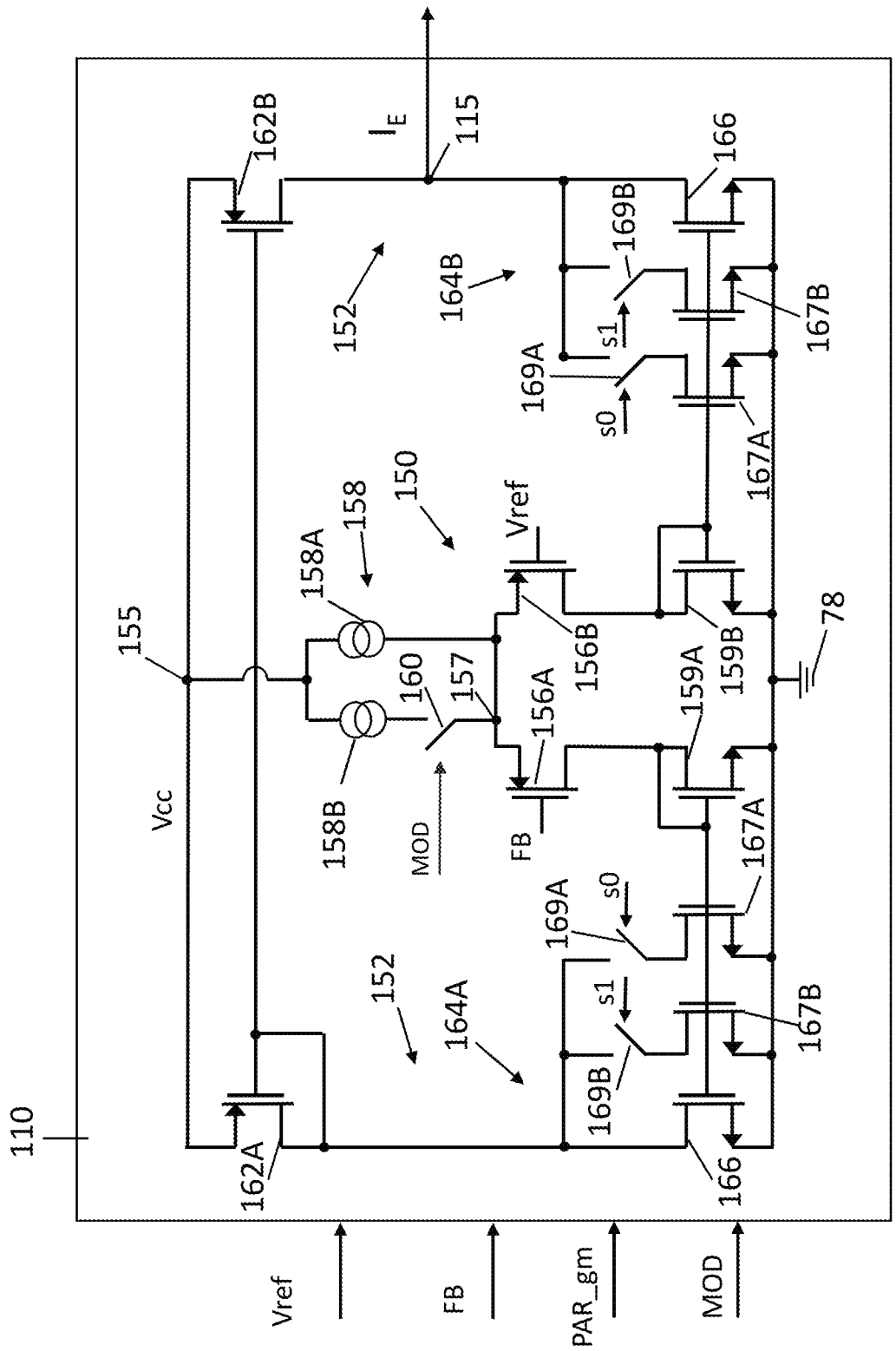
FIG. 8 shows a circuit diagram of a transconductance operational amplifier of the control loop circuit of FIG. 6.

FIG. 8 shows a circuit diagram of an embodiment of the OTA 110. In the embodiment illustrated, the OTA 110 is a single-stage amplifier obtained with MOSFET transistors.

In detail, the OTA 110 has an input stage 150 and an output stage 152 coupled between a supply node 155 and the ground 78.

The input stage 150 is formed by a first input transistor 156A and a second input transistor 156B, here MOSFET transistors of a P type, which receive at input the feedback voltage FB and, respectively, the reference voltage Vref.

The first and the second input transistors 156A, 156B have source terminals coupled together and to a source node 157, which is coupled to the supply node 155 by a tail current source 158.

The input transistors 156A, 156B moreover have drain terminals coupled to the ground 78 through a first tail transistor 159A and, respectively, a second tail transistor 159B.

The tail current source 158 is here formed by a first current source 158A and a second current source 158B, wherein the first current source 158A is fixed and the second current source 158B comprises a source switch 160 in series.

The source switch 160 enables to activate or deactivate, in use, the second current source 158B. In detail, the source switch 160 may be selectively opened or closed as a function of the mode signal MOD.

The current supplied by the tail current source 158 may therefore be chosen as a function of the operating mode of the regulator 52.

The output stage 152 has a configuration of the cascode type and is here formed by a first high-side mirror portion 162A and a second high-side mirror portion 162B, here two MOSFET transistors of a P type, and a first low-side mirror portion 164A and a second low-side mirror portion 164B coupled, respectively, to the first tail transistor 159A and to the second tail transistor 159B.

In this embodiment, the first and the second low-side mirror portions 164A, 164B have a variable mirror factor that may be selected as a function of the first signal PAR_gm of the control parameters signal PAR.

In detail, the first and the second low-side mirror portions 164A, 164B are each formed by a fixed transistor 166 and a plurality of selectable transistors, here a first selectable transistor 167A and a second selectable transistor 167B of an N-MOS type.

The first and the second low-side mirror portions 164A, 164B each comprise a first transistor switch 169A and a second transistor switch 169B connected in series, respectively, to the first and the second selectable transistors 167A, 167B.

The first signal PAR_gm of the control parameters signal PAR comprises, in the embodiment illustrated, two bits s0, s1, whose values control the switching of the first transistor switch 169A and of the second transistor switch 169B, respectively.

In practice, the first signal PAR_gm of the control parameters signal PAR modifies the mirror factor of the first and the second low-side mirror portions 164A, 164B.

Consequently, by modifying the mirror factor of the first and the second low-side mirror portions 164A, 164B and/or the value of current supplied by the tail current source 158, the gain gm of the OTA 110 may be modified, in use, as a function of the operating mode of the regulator 52.

Again with reference to FIG. 6, the compensation circuit 100 supplies the compensation voltage Vc to the correction circuit 106. The correction circuit 106 comprises a compensation current source 180, which generates a control current Ioc as a function of the compensation voltage Vc.

In detail, the compensation voltage Vc generates a compensation current Ic in the compensation-current source 180.

If the compensation current Ic is lower than a limit current value I_lim, then the control current Ioc supplied by the compensation current source 180 is equal to the compensation current Ic. If, instead, the compensation current Ic is higher than the limit current value I_lim, then the control current Ioc is equal to the limit current value I_lim.

In this embodiment, the control parameters signal PAR also comprises a fifth signal PAR_Ilim, which sets the limit current value I_lim.

Figure 9:
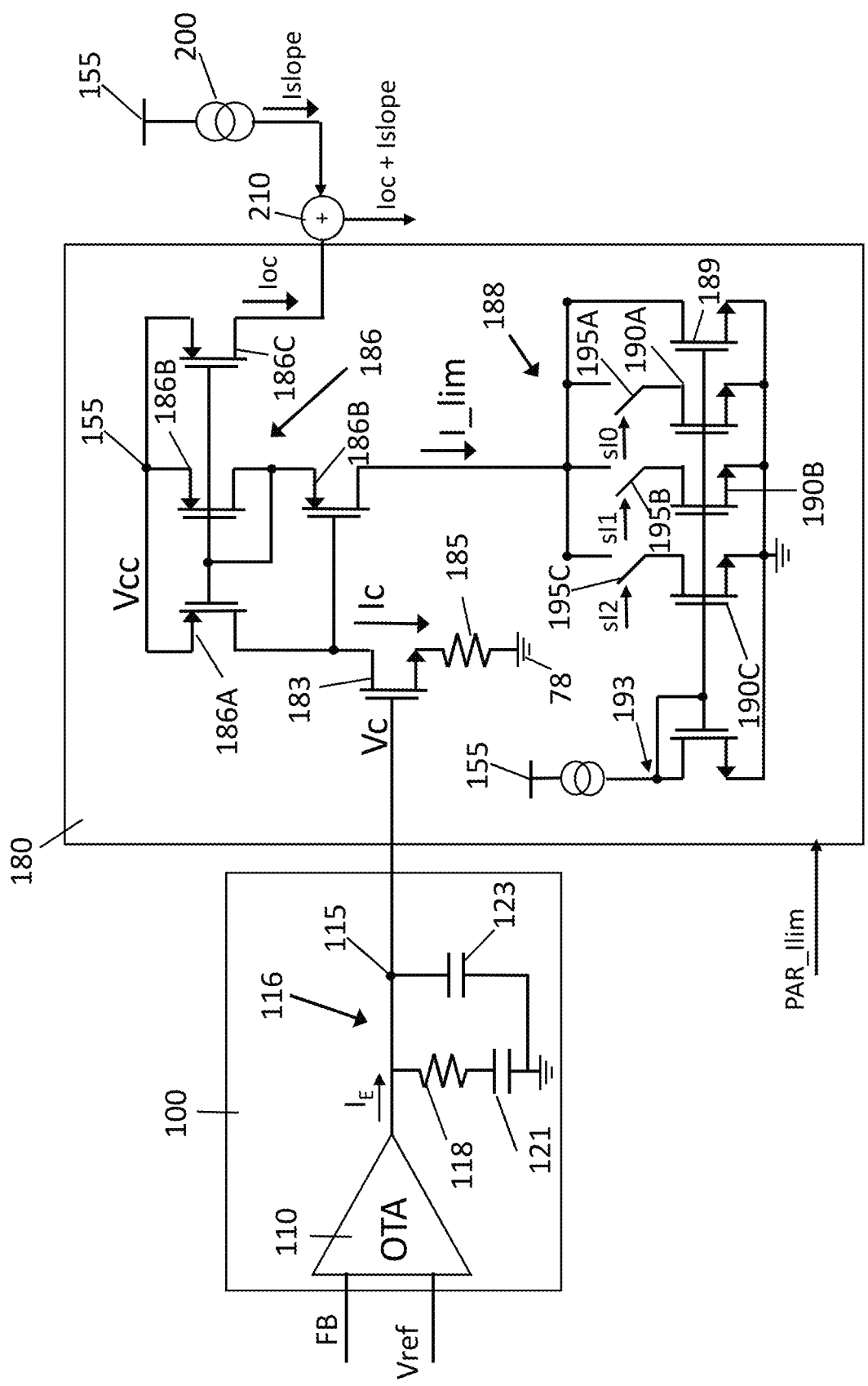
FIG. 9 shows a circuit diagram of another portion of the control loop circuit of FIG. 6.

FIG. 9 shows an embodiment of the compensation current source 180, here obtained using MOSFET transistors, comprising an input transistor 183 having a gate terminal coupled to the control voltage Vc and a source terminal coupled to the ground 78 through a resistor 185.

The compensation current Ic, which is a function of the compensation voltage Vc, therefore flows through the input transistor 183 of the compensation-current source 180.

The compensation current source 180 comprises a current-mirror portion 186 and a current-limiting portion 188, configured to set the limit current value I_lim, i.e., a maximum current value that may be mirrored at output by the compensation-current source 180.

In detail, in this embodiment, the current-mirror portion 186 is formed by an input mirror branch 186A coupled to the input transistor 183, an intermediate mirror branch 186B coupled in series to the current-limiting portion 188, and an output mirror branch 186C that supplies the control current Ioc at output from the compensation current source 180.

The intermediate mirror branch 186B is coupled in series to the current-limiting portion 188.

In this embodiment, the current-limiting portion 188 has a variable mirror factor that may be selected as a function of the fifth signal PAR_Ilim of the control parameters signal PAR.

In detail, the current-limiting portion 188 is formed by a fixed transistor 189, a plurality of limitation transistors, here a first limiting transistor 190A, a second limiting transistor 190B, and a third limiting transistor 190C of an N-MOS type, and a mirror portion 193 that controls switching-on of the first, the second, and the third limiting transistors 190A, 190B, 190C.

The current-limiting portion 188 comprises a plurality of limiting switches, one for each limiting transistor 190A-190C; in particular, here, a first limiting switch 195A, a second limiting switch 195B, and a third limiting switch 195C connected in series, respectively, to the first, the second, and the third limiting transistors 190A-190C.

The fifth signal PAR_Ilim of the control parameters signal PAR comprises, in the embodiment illustrated, three bits sI0, sI1, sI2, whose values control switching of the first, the second, and the third limiting switches 195A, 195B, 195C, respectively.

In practice, by controlling opening and closing of the limiting switches 195A-195C, the fifth signal PAR_Ilim of the control parameters signal PAR modifies the mirror factor of the current-limiting portion 188, and thus determines the maximum current value I_lim that the compensation-current source 180 may supply at output.

In this embodiment, the correction circuit 106 also comprises a slope-current source 200 and an offset-current source 205.

The slope-current source 200 generates a current Islope that is added in a sum node 210 to the control current Ioc supplied by the compensation-current source 180. The current Islope may be determined, in a known way, as a function of a difference between the input voltage Vin and the output voltage Vout and is useful, for example, in applications in which the regulator 52 operates at a fixed frequency, for damping the onset of sub-harmonic oscillations.

The offset-current source 205 generates a variable offset current I_off, whose value may be modified by a sixth signal PAR_Ioff of the control parameters signal PAR.

The selectable values of the offset current I_off are chosen in the design stage and are useful for setting a maximum value of current that can flow in the inductor 87. For instance, the offset current I_off may determine a maximum negative current value in the inductor 87, i.e., that flows from the intermediate node 85 of the second half-bridge 65 to the intermediate node 74 of the first half-bridge 74 (FIG. 4).

The correction circuit 106 provides the differential signal DIFF between a first input node 215 and a second input node 216 of the comparator 107, which in turn generates the pulse-width-modulated signal PWM.

In the embodiment illustrated, the correction circuit 106 also comprises a first input resistor 220, which has a resistance Rth and is coupled between the first input node 215 of the comparator 107 and the common node 72, and a second input resistor 221, which has a resistance Rth and is coupled between the second input node 216 of the comparator 107 and the ground 78.

In this embodiment, the resistance Rth of the first and the second input resistors 220, 221 is much higher than the resistance Rs of the sense resistor 80. Purely by way of example, the resistance Rth may be of the order of kiloohms and the resistance Rs of the order of milliohms.

The output of the sum node 210 and the output of the offset-current source 205 are coupled to the first input node 215 or the second input node 216 of the comparator 107 by a respective switch 225A, 225B, according to the current operating mode of the regulator 52.

In detail, in buck mode, the output of the sum node 210 is coupled to the first input node 215 of the comparator 107, and the output of the offset-current source 205 is coupled to the second input node 216 of the comparator 107.

In practice, the control current Ioc and the slope current Islope may flow to the ground 78 through the first input resistor 220, and the detection resistance 80 and the offset current Ioff may flow to the ground 78 through the second input resistor 221.

The differential signal DIFF is thus here given by the relation DIFF=Rth·(Ioc+Islope)−Rth·I_off−Rs·$I_L$.

In buck mode, the pulse modulator 107 is configured to be triggered when $I_L < [(Ioc+Islope)-Ioff] \cdot Rth/Rs$.

Instead, in boost mode, the output of the sum node 210 is coupled to the second input node 216 of the comparator 107, and the output of the offset-current source 205 is coupled to the first input node 215 of the comparator 107.

In practice, the offset current Ioff may flow to the ground 78 through the first input resistor 220 and the sense resistance 80, and the control current Ioc and the slope current Islope may flow to the ground 78 through the second input resistor 221.

The differential signal DIFF is thus here given by the relation $DIFF = Rth \cdot I\_off - Rth \cdot (Ioc+Islope) + Rs \cdot I_L$.

In boost mode, the pulse modulator 107 is configured to be triggered when $I_L > [(Ioc+Islope)-Ioff] \cdot Rth/Rs$.

The driving logic circuit 94 generates, in a known way, from the pulse-width-modulated signal PWM, the four switch-command signals T1, T2, T3, T4 for switching appropriately the first and the second half-bridges 64, 65 of the switching circuit 60.

The configurability of the elements that form the control loop circuit 91, in particular of the compensation circuit 100, enables to modify, in use, a transfer function of the control loop circuit 91. Consequently, by modifying the transfer function of the control loop circuit 91, it is possible to optimise the performance of the regulator 52 in each operating mode.

For instance, the values of the control parameters stored in the register 99 may be chosen, in the design stage, so as to guarantee high stability and excellent dynamic performance, for example a large bandwidth, of the regulator 52, irrespective of the current operating mode of the regulator 52.

Furthermore, the configurability of the value of the limit current I_lim at output from the compensation-current source 180 makes it possible to guarantee an optimised protection from overload in any operating mode of the regulator 52.

The compensation network 116 forms a second-order compensator. However, the compensation network may also be a compensator of a different order, according to the specific application.

Figures 10, 11:
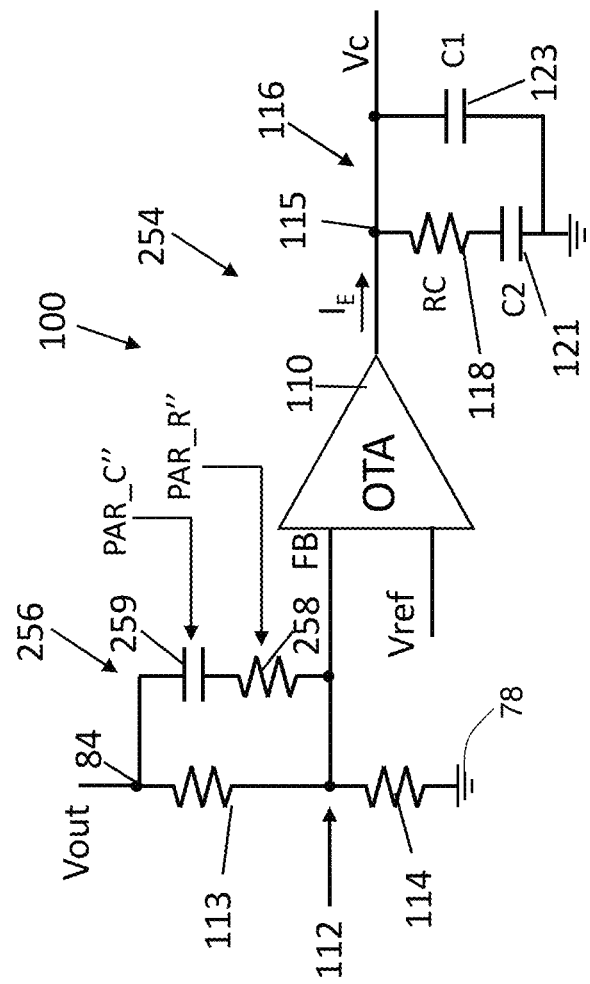
FIGS. 10 and 11 show different embodiments of the portion of the loop control circuit of FIG. 6.

FIG. 10 shows a different embodiment of the compensation circuit, here designated again by 100, wherein the compensation network, here designated by 250, is of the first order. In detail, the compensation network 250 is formed by just one compensation capacitor 251 coupled between the output 115 and the ground 78. The compensation capacitor 251 has a variable capacitance, whose value may be controlled by a signal PAR_C' of the control parameters signal PAR. For instance, the value of capacitance of the compensation capacitor 251 may be modified in a way similar to what has been illustrated in FIG. 7 for the first compensation capacitor 123.

FIG. 11 shows another embodiment of the compensation circuit, once again here designated by 100, wherein the compensation network, here designated by 254, is of the third order. In detail, the compensation network 254 is formed by an output sub-network, which is the same as the compensation network 116 of FIG. 6 and is consequently designated once again by 116, and a variable input sub-network 256.

The variable input sub-network 256 is coupled between the output node 84 of the regulator 52, at the output voltage Vout, and an intermediate node of the feedback voltage divider 112, between the first and the second input resistors 113, 114.

In detail, the input sub-network 256 is coupled in parallel to the first input resistor 113 and is formed by an input compensation resistor 258 having a resistance R" and an input compensation capacitor 259 having a capacitance C", coupled together in series.

In this embodiment, both the capacitance C" of the input compensation capacitor 259 and the resistance R" of the input compensation resistor 258 are variable and controlled, respectively, by a signal PAR_C" and a signal PAR_R" of the control parameters signal PAR.

For instance, the capacitance C" of the input compensation capacitor 259 and the resistance R" of the input compensation resistor 258 may be modified in a way similar to what has been illustrated in FIG. 7 for the compensation resistor 118 and the second compensation capacitor 121.

Figure 12:
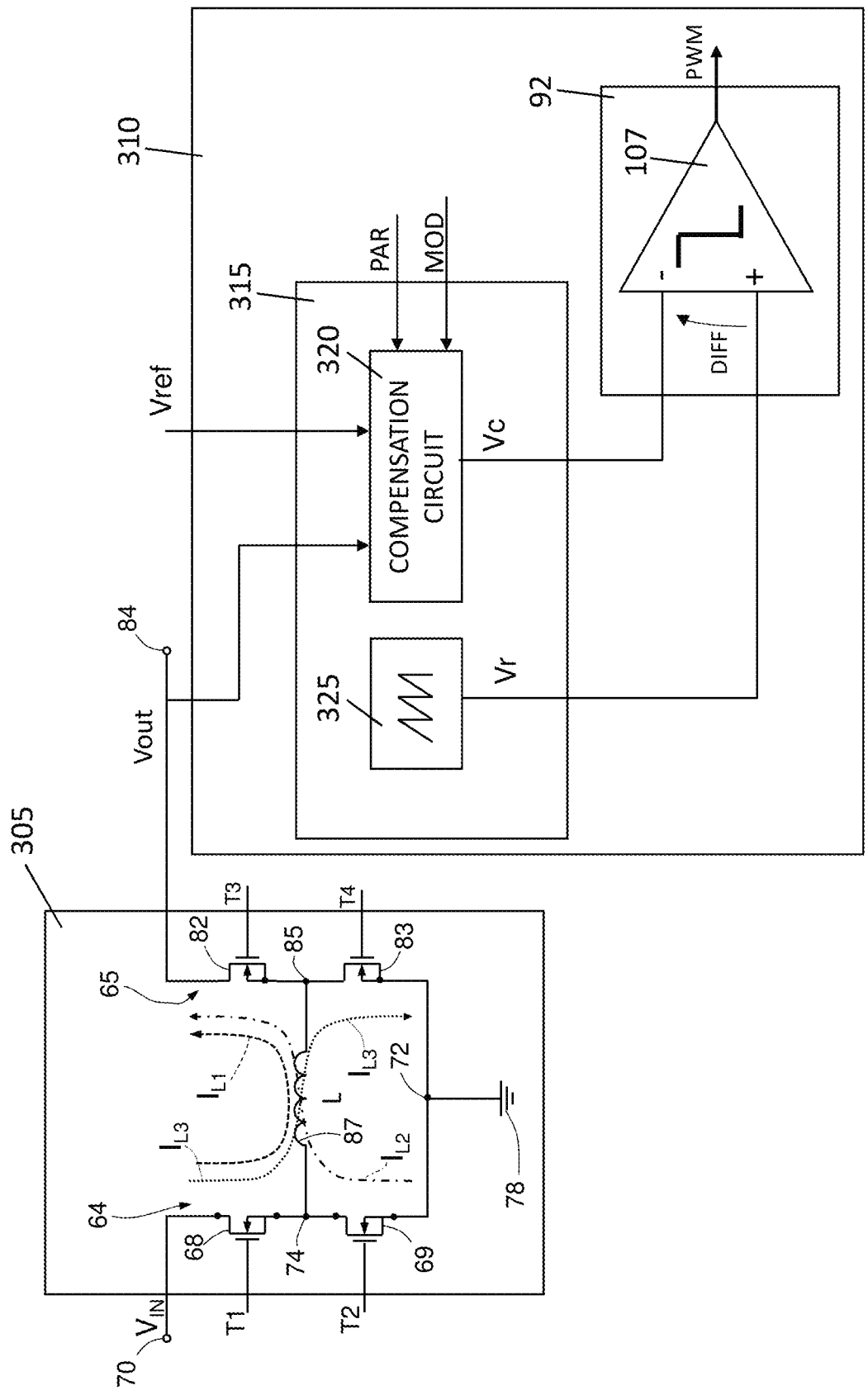
FIG. 12 shows the present voltage regulator according to a different embodiment.

FIG. 12 shows a different embodiment of the regulator 52 comprising the switching circuit 305 and the control device 310 (illustrated only in part in FIG. 12).

In detail, the control device 310 also here comprises (FIG. 3) the operating-mode determination module 89, the driving logic circuit 94, the register 99 and (FIG. 10) the pulse-modulation circuit 92 and a control loop circuit, designated by 315.

The switching circuit 305 has a general structure similar to the switching circuit 60 of FIG. 4; consequently, elements in common are designated by the same reference numbers and are not described any further herein.

The switching circuit 305 differs from the switching circuit 60 in that the common node 72 is directly coupled to the ground 78.

In practice, in the embodiment of FIG. 12 the regulator 52 has a voltage-control mode; consequently, the sense resistor 80 of FIG. 4 is not present in the switching circuit 305.

The control loop circuit 315 comprises a compensation circuit 320, which generates the compensation voltage Vc from the difference between the output voltage Vout and the reference voltage Vref, and a ramp-generator module 325, which generates a periodic reference signal Vr, in particular a saw-tooth signal.

The compensation voltage Vc and the periodic reference signal Vr are supplied at input to the pulse modulator 67, from which the comparator 107 can generate, in a known way, the pulse-width-modulated signal PWM.

Also in this embodiment, the control parameters of the compensation circuit 320 are variable, in use, as a function of the control parameters signal PAR and of the mode signal MOD.

Figure 13:
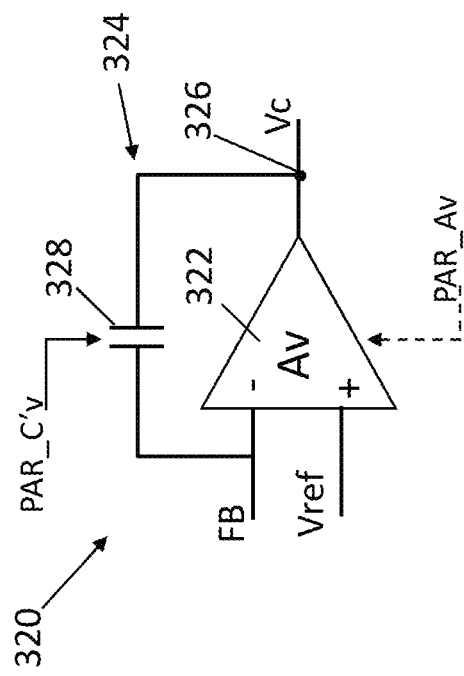

FIG. 13 shows an embodiment of the compensation circuit 320 comprising an operational amplifier 322 having a gain Av, and a variable compensation network, here designated by 324.

In this embodiment, the gain Av of the operational amplifier 322 is fixed.

However, also the value of the gain Av of the operational amplifier 322 may be variable. For instance, it may be controlled, in use, by a signal PAR_Av (represented by a dashed arrow in FIG. 13) of the control parameters signal PAR, for example in a way similar to what has been illustrated for the OTA 110 in FIG. 8.

The operational amplifier 322 has an inverting input at the feedback voltage FB, a non-inverting input at the reference voltage Vref, and an output node 326 at the compensation voltage Vc.

The variable compensation network 324 is of the first type and is formed by just one compensation capacitor, here designated by 328, which has a capacitance C'v and is coupled between the inverting input and the output node 326 of the operational amplifier 322.

The value of the capacitance C'v of the compensation capacitor 328 is controlled, in use, by a signal PAR_C'v of the control parameters signal PAR, for instance in a way similar to what has been illustrated in FIG. 7 and here not described any further.

FIG. 14 shows a different embodiment of the compensation network 324 of FIG. 13, here designated by 330. The compensation network 330 is of the second order and also comprises a compensation sub-network 332 coupled between the output node 326 and the inverting input of the operational amplifier 322, in parallel to the compensation capacitor 328.

The compensation sub-network 332 is formed by a resistor 334 having a variable resistance Rv and a capacitor 335 having a variable capacitance C"v, coupled in series. The variable capacitance C"v of the capacitor 335 and the resistance Rv of the resistor 334 are controlled, in use, by a signal PAR_C"v and a signal PAR_Rv, respectively, of the control parameters signal PAR, for instance in a way similar to what has been illustrated in FIG. 7 and here not described any further.

FIG. 15 shows a further embodiment of the compensation network 330 of FIG. 14, here designated by 340. With respect to the compensation network 330 of FIG. 14, the compensation network 340 is of the third order and also comprises an input sub-network 342 coupled between the output node 84 of the regulator 52 and the inverting input of the operational amplifier 322.

In detail, the input sub-network 342 is formed by a resistor 344 having a variable resistance R'v and a capacitor 345 having a variable capacitance C'''v, coupled in series. The variable capacitance C'''v of the capacitor 345 and the resistance R'v of the resistor 344 are controlled, in use, by a signal PAR_C'''v and a signal PAR_R'v, respectively, of the control parameters signal PAR, for example in a way similar to what has been illustrated in FIG. 7 and here not described any further.

In practice, in use, the configurability of the compensation circuit 320 makes it possible to optimise the performance of the regulator 52 of FIG. 12 in each operating mode, also in a voltage-control mode.

Finally, it is clear that modifications and variations may be made to the regulator 52 described and illustrated herein, without thereby departing from the scope of the present invention, as defined in the annexed claims.

Figure 6:
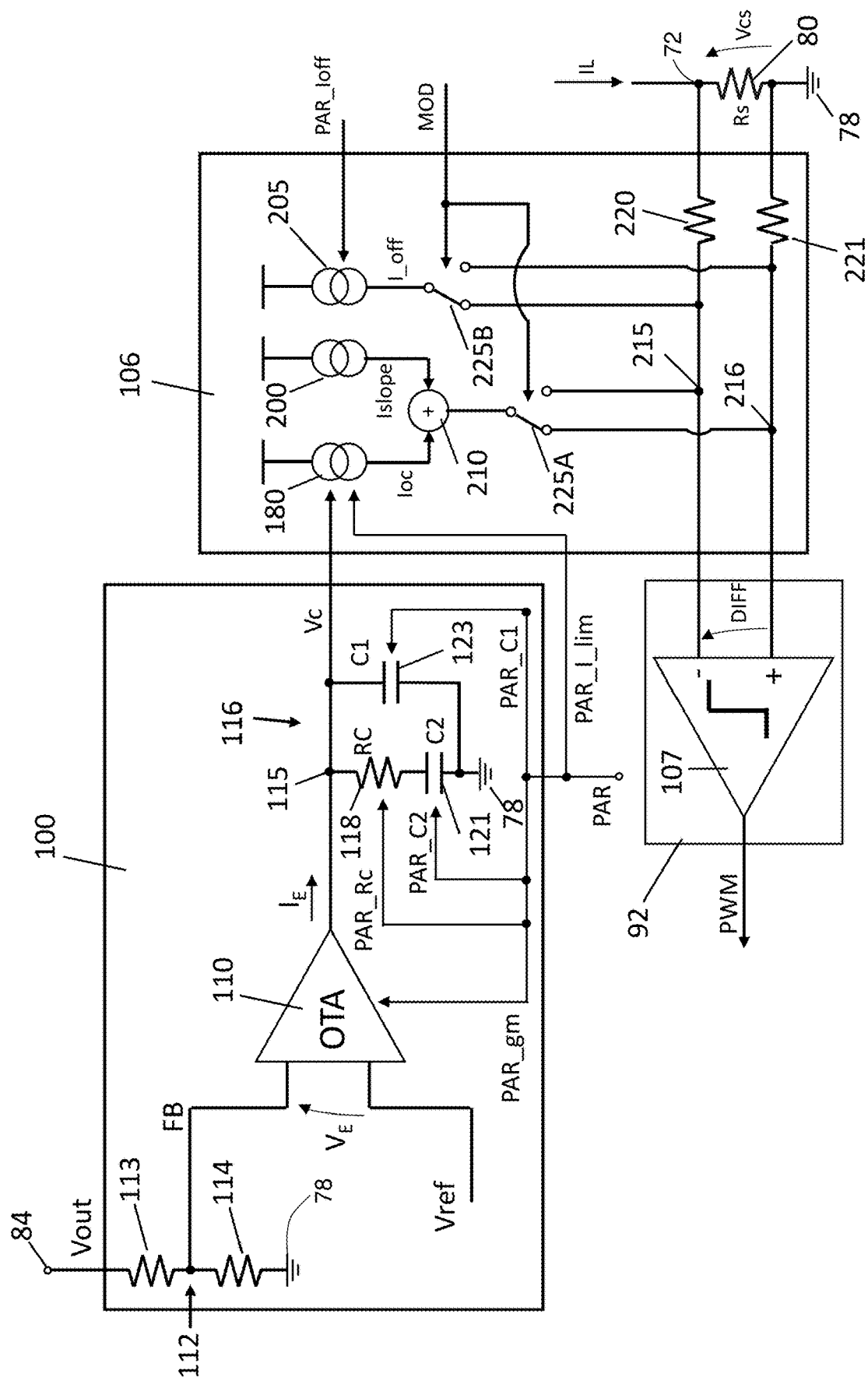
FIG. 6 shows a circuit diagram of the loop control circuit of FIG. 4, according to one embodiment.

For instance, the compensation circuit 320 of FIGS. 13, 14, and 15 may be used also in the current-control mode, in place of the compensation circuit 100 of FIGS. 6, 10, and 11. Likewise, the compensation circuit 100 of FIGS. 6, 10, and 11 may also be used in the voltage-control mode, in place of the compensation circuit 320 of FIGS. 13, 14, and 15.

Figure 16:
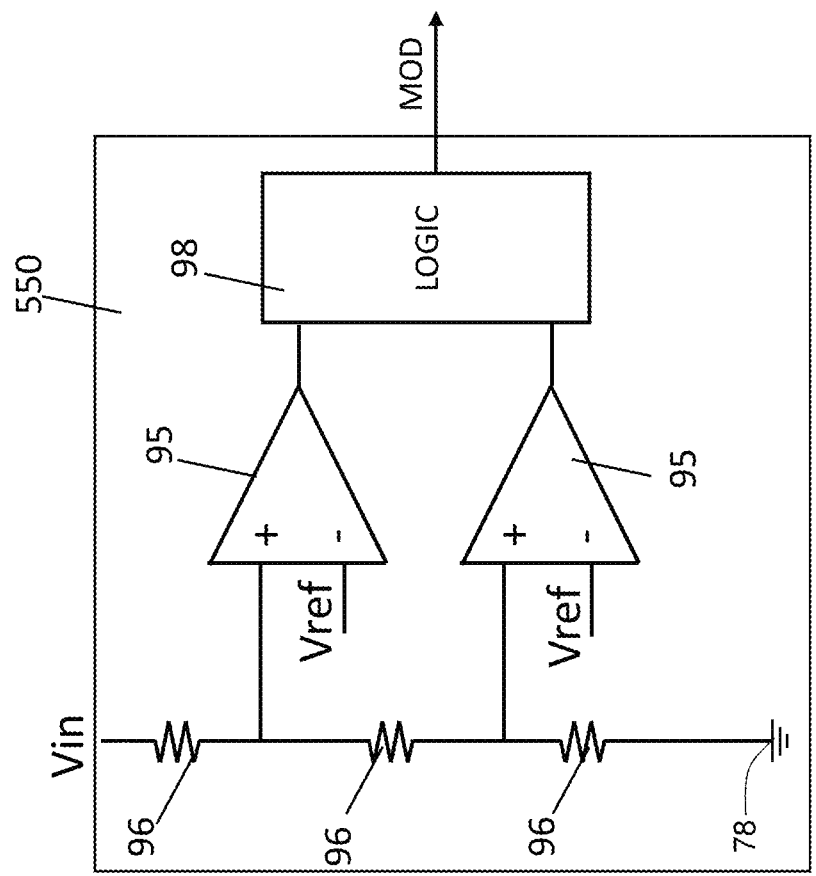
FIG. 16 shows a block diagram of the portion of the voltage regulator of FIG. 5 according to a different embodiment.

According to another embodiment, the operating-mode determination module, designated by 550 in FIG. 16, may determine the operating mode of the regulator 52 by comparing the input voltage Vin with the reference voltage Vref.

Figure 17:
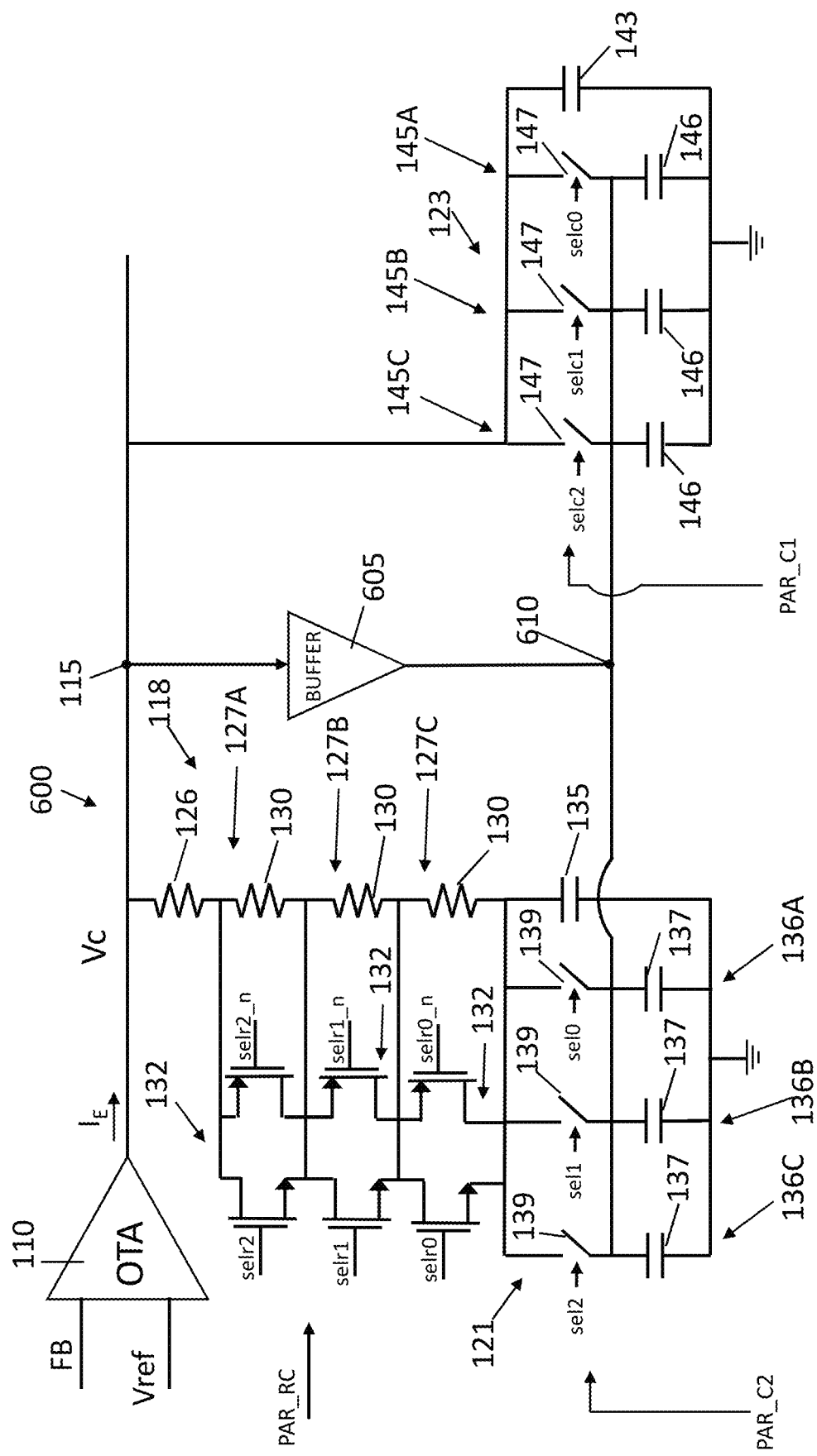
FIG. 17 shows a circuit diagram of the portion of the control loop circuit of FIG. 6, according to a different embodiment.

The compensation network 116 may be obtained in a way different from what has been illustrated in FIG. 7. For instance, FIG. 17 shows a different embodiment of the compensation network 116 of FIG. 7, here designated by 600. The compensation network 600 has the same structure as the compensation network 116 and further comprises a buffer 605 having an input node in common with the output 115 of the OTA 110 and, at output, a charge node 610. In the compensation network 600, the capacitors 146 of the selectable capacitors 145A-145C of the first compensation capacitor 123, and the capacitors 137 of the selectable capacitors 136A-136C of the second compensation capacitor 121 are coupled between the ground 78 and the charge node 610.

In practice, in use, even when the first-capacitor switches 139 and the second-capacitor switches 147 are open, the buffer 605 maintains the compensation voltage Vc across the capacitors 146 of the selectable capacitors 145A-145C of the first compensation capacitor 123 and the capacitors 137 of the selectable capacitors 136A-136C of the second compensation capacitor 121.

The embodiments described may be combined to form further solutions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A control device comprising:
a first input configured to receive a measurement signal representative of an output voltage of a switching circuit of a voltage regulator;
a state determination block coupled to the first input and configured to generate a signal of actual operating condition of the voltage regulator; and
a driving signals generation module configured to generate at least one switching command signal for the switching circuit from an error signal representative of a difference between the output voltage and a nominal voltage,
wherein the driving signals generation module comprises an error-compensation circuit having a transfer function and configured to generate a control signal from the error signal and an actual operating condition signal, the control signal being a function of the actual operating condition,
wherein the error-compensation circuit comprises an error amplifier having a gain variable as a function of an actual operating mode and a compensation network comprising at least one passive electrical component, and
wherein the at least one passive electrical component has an electrical quantity that is variable as a function of the actual operating condition, the compensation network being coupled to an output of the error amplifier.

2. The control device according to claim 1, further comprising a memory element configured to store at least one value for each modifiable control parameter associated with a respective operating mode, and to supply to the error-compensation circuit a signal indicative of a value of each modifiable control parameter associated with the actual operating mode, the transfer function of the error-compensation circuit depending upon a plurality of modifiable control parameters.

3. The control device according to claim 1, further comprising a second input configured to receive an input signal representative of an input voltage of the switching circuit, wherein the state determination block comprises an operating-mode determination module configured to compare the input signal with the measurement signal and to determine whether the actual operating condition is a buck, boost, or buck-boost operating condition.

4. The control device according to claim 1, wherein the compensation network is of a first order, a second order or a third order.

5. The control device according to claim 1,
wherein the error amplifier is a transconductance amplifier,
wherein the compensation network is of a second order,
wherein the compensation network is coupled between the output of the error amplifier and a reference-potential node and comprises a first variable capacitor, a second variable capacitor and a variable resistor,
wherein the first variable capacitor is coupled between the output of the error amplifier and the reference-potential node, and
wherein the second variable capacitor and the variable resistor are mutually coupled in series between the output of the error amplifier and the reference-potential node.

6. The control device according to claim 5,
wherein the variable resistor comprises at least one fixed resistor and at least one selectable resistor mutually coupled in series, the at least one selectable resistor being activatable and deactivatable by a respective switch, and
wherein the first and the second variable capacitors each comprises a respective fixed capacitor and at least one respective selectable capacitor mutually coupled in parallel, the at least one selectable capacitor being activatable or deactivatable by a respective switch.

7. The control device according to claim 6, wherein the compensation network further comprises a buffer coupled between the output of the error amplifier and the first and the second variable capacitors.

8. The control device according to claim 1, wherein the gain of the error amplifier is modifiable by changing an internal current factor as a function of the actual operating mode of the voltage regulator.

9. The control device according to claim 1, further comprising a third input configured to receive a current signal representative of a current flowing in the switching circuit, wherein the driving signals generation module further comprises a correction circuit comprising a current-correction source configured to correct the current signal, and wherein the current-correction source is configured to supply a current value modifiable as a function of the actual operating mode.

10. The control device according to claim 9, wherein the correction circuit comprises a compensation-current source controlled by the control signal and configured to supply a maximum current value, the maximum current value being modifiable as a function of the actual operating mode.

11. The voltage regulator comprising:
the control device according to claim 9,
wherein the voltage regulator is current-controllable, and
wherein the voltage regulator is configured to operate in a plurality of operating conditions.

12. The voltage regulator comprising:
the control device according to claim 9; and
the switching circuit comprising a first half-bridge, a second half-bridge and an inductor,
wherein the first half-bridge comprises a first switch and a second switch coupled in series between an input node and a common reference-potential node,
wherein the second half-bridge comprises a third switch and a fourth switch coupled in series between an output node and the common reference-potential node,
wherein the inductor is coupled between intermediate nodes of the first and the second half-bridges,
wherein the driving signals generation module is configured to generate a first switching-command signal, a second switching-command signal, a third switching-command signal and a fourth switching-command signal for controlling the first, the second, the third, and the fourth switches, respectively, and
wherein the voltage regulator is configured to operate in a plurality of operating conditions.

13. A method for operating a voltage regulator in a plurality of operating conditions, the method comprising:
receiving, by a control device, a measurement signal representative of an output voltage of the voltage regulator;
generating, by the control device, an actual operating condition signal of the voltage regulator based on the measurement signal; and
generating, by the control device, at least one switching command signal for a switching circuit of the voltage regulator, starting from an error signal representing a difference between the output voltage and a nominal voltage,
wherein generating the at least one switching command signal comprises generating a control signal from the error signal, using a transfer function that is a function of an actual operating mode,
wherein the transfer function depends on a plurality of modifiable control parameters, and
wherein generating the control signal comprises selecting an actual value of each control parameter as a function of the actual operating mode, and modifying electrical characteristics of an error-compensation circuit of the control device as a function of the actual value of each modifiable control parameter.

14. The method according to claim 13, wherein the error-compensation circuit comprises an error amplifier and a compensation network, and wherein modifying the electrical characteristics of the compensation circuit comprises modifying a gain of the error amplifier and/or a number of passive electrical components that form the compensation network.

15. The method according to claim 13, further comprising receiving, by the control device, an input signal indicative of an input voltage of the voltage regulator, wherein determining an actual operating condition comprises determining a buck, boost, or buck-boost operating condition by comparing the input voltage and the output voltage.

16. A control device comprising:
a first input configured to receive a measurement signal representative of an output voltage of a switching circuit of a voltage regulator;
a state determination block coupled to the first input and configured to generate a signal of an actual operating condition of the voltage regulator; and
a driving signals generation module configured to generate at least one switching command signal for the switching circuit from an error signal representative of a difference between the output voltage and a nominal voltage,
wherein the driving signals generation module comprises an error-compensation circuit having a transfer function and configured to generate a control signal from the error signal and an actual operating condition signal, the control signal being a function of the actual operating condition; and a memory element configured to store at least one value for each modifiable control parameter associated with a respective operating mode, and to supply, to the error-compensation circuit, a signal indicative of a value of each modifiable control parameter associated with an actual operating mode, wherein the transfer function of the error-compensation circuit depends upon a plurality of modifiable control parameters.

17. The control device according to claim 16, further comprising a second input configured to receive an input signal representative of an input voltage of the switching circuit, wherein the state determination block comprises an operating-mode determination module configured to compare the input signal with the measurement signal and to determine whether the actual operating condition is a buck, boost, or buck-boost operating condition.

18. The control device according to claim 17, further comprising a third input configured to receive a current signal representative of a current flowing in the switching circuit, wherein the driving signals generation module further comprises a correction circuit comprising a current-correction source configured to correct the current signal, and wherein the current-correction source is configured to supply a current value modifiable as a function of the actual operating mode.

19. The control device according to claim 18, wherein the correction circuit comprises a compensation-current source controlled by the control signal and configured to supply a maximum current value, the maximum current value being modifiable as a function of the actual operating mode.

20. A control device comprising:
a first input configured to receive a measurement signal representative of an output voltage of a switching circuit of a voltage regulator;
a state determination block coupled to the first input and configured to generate a signal of actual operating condition of the voltage regulator;
a driving signals generation module configured to generate at least one switching command signal for the switching circuit from an error signal representative of a difference between the output voltage and a nominal voltage,
wherein the driving signals generation module comprises an error-compensation circuit having a transfer function and configured to generate a control signal from the error signal and an actual operating condition signal, the control signal being a function of the actual operating condition; and
a third input configured to receive a current signal representative of a current flowing in the switching circuit,
wherein the driving signals generation module further comprises a correction circuit comprising a current-correction source configured to correct the current signal,
wherein the current-correction source is configured to supply a current value modifiable as a function of an actual operating mode, and
wherein the correction circuit comprises a compensation-current source controlled by the control signal and configured to supply a maximum current value, the maximum current value being modifiable as a function of the actual operating mode.

* * * * *

UNITED STATES PATENT AND TRADEMARK OFFICE
CERTIFICATE OF CORRECTION

PATENT NO. : 12,218,596 B2
APPLICATION NO. : 17/841182
DATED : February 4, 2025
INVENTOR(S) : Floriani et al.

It is certified that error appears in the above-identified patent and that said Letters Patent is hereby corrected as shown below:

In the Claims

In Column 16, in Claim 1, Line 29, after "signal of" insert -- an --.

In Column 20, in Claim 20, Line 6, after "signal of" insert -- an --.

Signed and Sealed this
First Day of April, 2025

Coke Morgan Stewart
*Acting Director of the United States Patent and Trademark Office*